United States Patent
Kamp

(10) Patent No.: US 8,443,715 B2
(45) Date of Patent: May 21, 2013

(54) PISTON-PIN BORE DIMENSIONS FOR A PISTON OF AN INTERNAL COMBUSTION ENGINE

(75) Inventor: Hartmut Kamp, Heilbronn (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 390 days.

(21) Appl. No.: 12/065,356

(22) PCT Filed: Aug. 30, 2006

(86) PCT No.: PCT/EP2006/008479
§ 371 (c)(1),
(2), (4) Date: Jun. 6, 2008

(87) PCT Pub. No.: WO2007/025733
PCT Pub. Date: Mar. 8, 2007

(65) Prior Publication Data
US 2008/0307957 A1    Dec. 18, 2008

(30) Foreign Application Priority Data

Sep. 3, 2005   (DE) .......................... 10 2005 041 907

(51) Int. Cl.
*F16J 1/16*   (2006.01)

(52) U.S. Cl.
USPC .......................................................... 92/187

(58) Field of Classification Search
USPC .......................................................... 92/187
See application file for complete search history.

(56) References Cited

U.S. PATENT DOCUMENTS 5,746,169 A * 5/1998 Issler et al. ...................... 92/187
7,647,863 B2 * 1/2010 Issler et al. ...................... 92/187

FOREIGN PATENT DOCUMENTS

| DE | 3036062 | 4/1982 |
| DE | 4111368 | 1/1992 |
| DE | 10231233 | 2/2004 |
| FR | 2157319 | 6/1973 |

* cited by examiner

*Primary Examiner* — F. Daniel Lopez
(74) *Attorney, Agent, or Firm* — Young Basile Hanlon & MacFarlane P.C.

(57) ABSTRACT

A piston with a piston boss in which a piston-pin bore is provided for accommodating a piston-pin. The piston-pin bore widens in the direction of a piston of a piston inner area with the widening above a bore axis with regard to a piston stroke axis, is less than the widening below the bore axis or vice versa.

10 Claims, 2 Drawing Sheets

PISTON-PIN BORE DIMENSIONS FOR A PISTON OF AN INTERNAL COMBUSTION ENGINE

BACKGROUND

The invention relates to a piston with a piston skirt having a piston-pin bore.

Pistons with piston skirts for an internal combustion engine in which a piston-pin bore in the piston skirt is introduced as a formed bore are universally known. Because of the loads on the inner surfaces of the piston-pin bore in which the pin which connects the piston to the connecting rod is located, the pin is exposed to extremely high loads in operation because of pin deformation during the motion of the piston. To compensate for the deformation of the piston-pin bore (boss bore) it is known in the prior art (for example, DE 21 52 462 A1, DE 30 36, 062 C2, DE 41 41 279 C2, DE 44 41 450 A1 or DE 102 31 233 A1) to design the boss bore to be oval, circular or cylindrical in segments or sections along the surface line of the piston-pin bore. However, in the transition from a section with one shape to another section with a different shape, transitions result which create a step and which disadvantageously result in an additional load on the boss bore and the pin located therein.

Thus it known from the disclosure DE 21 52 462 or patent DE 27 56 878 C2 that the piston-pin bore widens evenly (approximately trumpet-shaped) in the direction of the piston inner area referenced to the pin axis. In patent DE 30 36 062 C2 it widens only above the bore axis. With these widening shapes of the piston-pin bore in the axial direction of the piston inner area, better seating of the pin on the surface of the piston-pin bore is certainly achieved if the pin deforms when the piston is operating, but because of the demands made on modern combustion engines with respect to fuel consumption and exhaust emissions which must be complied with, resulting in corresponding combustion temperatures and combustion pressures during the operation of the piston in the combustion engine, the total load on the piston-pin bore and piston pin system is still extremely high and support of the piston pin in the piston-pin bore is not optimal.

It would be desirable to provide a piston-pin bore configured as a formed bore for a piston which avoids the disadvantages described above, that is, with which an increased load on the entire piston can be achieved and any additional, or the entire, load on the boss bore/pin system is reduced.

SUMMARY

In accordance with the invention, the widening length of the piston-pin bore in the axial direction towards the piston inner area, above a bore axis of the piston-pin bore, referenced to a piston stroke axis, is less than the widening length below the bore axis (or vice versa). Thus the circumstance is used that because of the geometry of the piston-pin bore, the contact surfaces of the piston pin in the piston-pin bore, in particular in the direction of the piston stroke axis during the upward and downward motion of the piston in the cylinder of the internal combustion engine, are matched to the deformation of the piston pin. In addition, this special widening of the piston-pin bore takes into account not only the deformation of the piston pin but also the deformation of the piston itself during operation in the internal combustion engine, which has not been considered thus far in the prior art. Because of these deformations, both of the piston and of the piston pin in the course of operation, which are different above and below the pin axis, it is now possible to distribute these loads on the piston pin evenly onto the contact surfaces of the piston-pin bore (in particular in its zenith and in the areas around it, referenced to the piston stroke axis) and thus to reduce the overall load on the piston-pin bore and pin system. In this way higher loading on the piston can be achieved since the deformation of the piston pin under load is matched to the deformation of the piston itself (or its piston-pin bore).

In a further aspect, the surfaces line of the piston-pin bore are round or oval. As a result of this latitude in bore geometry over the axial extension, a further adaptation can be made to the deformation of piston and piston pin under load.

In a refinement, the widening above the bore axis, but now in the direction of the outside of the piston referenced to the piston stroke axis, is smaller than the widening in the same direction below the pin axis or vice versa. Although the greatest surface pressures occur in the part of the piston-pin bore facing the piston inner area during deformation, the piston-pin bore can also undergo widening in the direction of the piston exterior to further absorb the forces acting on it, said widening being asymmetrical referenced to the pin axis.

In a further aspect, the piston boss is configured as a trapezoidal boss. In the case of this trapezoidal boss construction, the widening above the bore axis referenced to the piston stroke axis is also smaller than the widening below the pin axis or vice versa. This means that the invention is not restricted to a specific piston boss design.

In another refinement, the transition from one section with a first shape to the next section with a different shape is configured continuously. The advantageous achievement is that the previously known sectional shaping of the piston-pin bore is eliminated by creating continuous transitions during machining, for example, from circular to cylindrical, from circular to oval, from cylindrical to oval, from oval to circular, from oval with a first radius to an oval shape with a different radius, and similar. It should be pointed out here that the enumeration just given is only an example and is not restrictive. Furthermore, the shapes transitioning into each specific geometry around the circumference of the bore advantageously have different radii so that the longitudinal axes of the individual sections with their specific shape both perpendicular and parallel to the piston axis are designed to widen differently around the circumference. For example, the shapes transitioning into the oval geometry around the circumference of the bore have different radii so that the longitudinal axes of the individual ovalities are designed to widen differently around the circumference both perpendicular and parallel to the piston axis (=piston stroke axis). This latitude in design and machining in the sectional geometry and thus of the entire geometry over the axial extension of the piston-pin bore (bore length) and its lateral surfaces thus permits a precise, exact adaptation to the distortion of the piston-pin bore or of the pin during piston operation in the combustion chamber of the internal combustion engine.

In one aspect, starting from the zenith of the piston-pin bore in the direction of the area of the piston facing a combustion chamber of the internal combustion engine, the surface line is configured with radii which change over the axial extension and, in the direction of the circumference of the piston-pin bore. The surface lines are configured elliptically with changing radii. For example, the shape (geometry) of the piston-pin bore can have a stepless oval, circular (cylindrical) and oval geometry again, with freely selected alignment and length of the ovality axes. The choice of alignment and length of the ovality axes is determined according to the geometries of the piston, specifically of the axial extension and diameter of the pin and specifically according to the diameter and height of the piston.

In sum, the invention offers an optimized piston-pin bore shape, i.e., adapted to the deformation forces to minimize friction in the pin boss while simultaneously insuring lubrication of the piston pin over the entire lateral surface. It is particularly significant here that the invention enables lubrication of the piston pin over the entire lateral surface which was not possible with the previous prior art designs. In addition, the design of the piston-pin bore geometry in accordance with the invention lessens the risk of pistons or piston pins fracturing, reduces weight while retaining strength, and further reduces frictional forces.

BRIEF DESCRIPTION OF THE DRAWING

Aspects of the invention to which it is not restricted, however, are described in what follows and explained using the drawing in which.

DESCRIPTION

Figure 1:
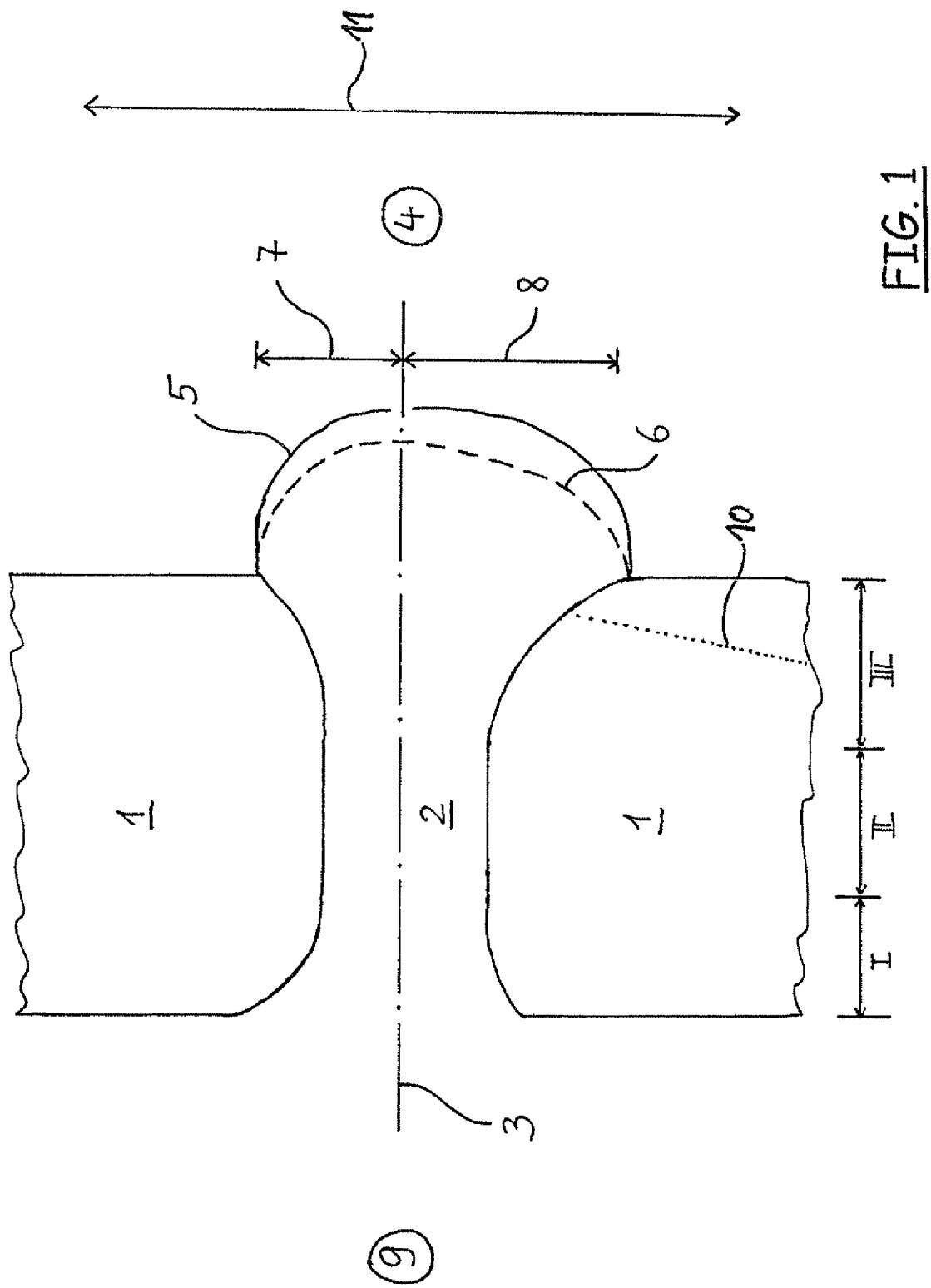
FIG. 1 is a pictorial representation of a piston.

A section of a piston for a combustion engine is shown in FIG. 1, where this single- or multi-piece piston has a piston boss 1 shown schematically in an intrinsically known way.

A piston-pin bore 2 is introduced into the piston boss 1 which has a bore axis 3. A piston interior area 4 is identified so that the piston boss 2, not shown further, is to the right when looking at FIG. 1 because of the symmetrical arrangement of the piston bosses below a piston crown of the piston. It can be seen very clearly in FIG. 1 that the piston-pin bore 2 widens in the direction of the piston inner area 4 and has an exemplary trumpet-shaped form. The surface lines 5 or 6 of the widening piston-pin bore 2 can have different dimensions and, depending on piston geometry, are round or oval with a changing diameter or changing small and large semi-axes of the oval in their axial progression (towards the piston inner area 4 and/or piston outer area 9). An upper length 7, referenced to the bore axis 3, is smaller than the lower length 8 below the bore axis 3 (or vice versa). The same holds true for the progression of the piston-pin bore in the direction of the piston outer area 9, where in this instance the widening length above the bore axis 3 is greater than the widening length of the piston-pin bore 2 below the bore axis 3. As a result of these different, progressive widenings of the piston-pin bore 2, in the direction of the piston inner area 4 and/or in the direction of the piston outer area 9, it becomes possible for the piston pin, not shown, to be optimally supported in the piston-pin bore 2, particularly in the direction of the piston inner area 4, during operation of the internal combustion engine, taking into account both its own deformation and the deformation of the piston in the areas of the piston boss 1. This support is provided specifically in the areas of the zenith of the piston-pin bore 2 and around it, referenced to the piston stroke axis 11. In FIG. 1, a dotted line indicates another inner wall 10 in the piston boss 1, which makes clear that these piston-pin bore widenings can be applied equally to a trapezoidal piston boss as well to other shapes for the piston boss 1, for example, stepped piston bosses.

Figure 2:
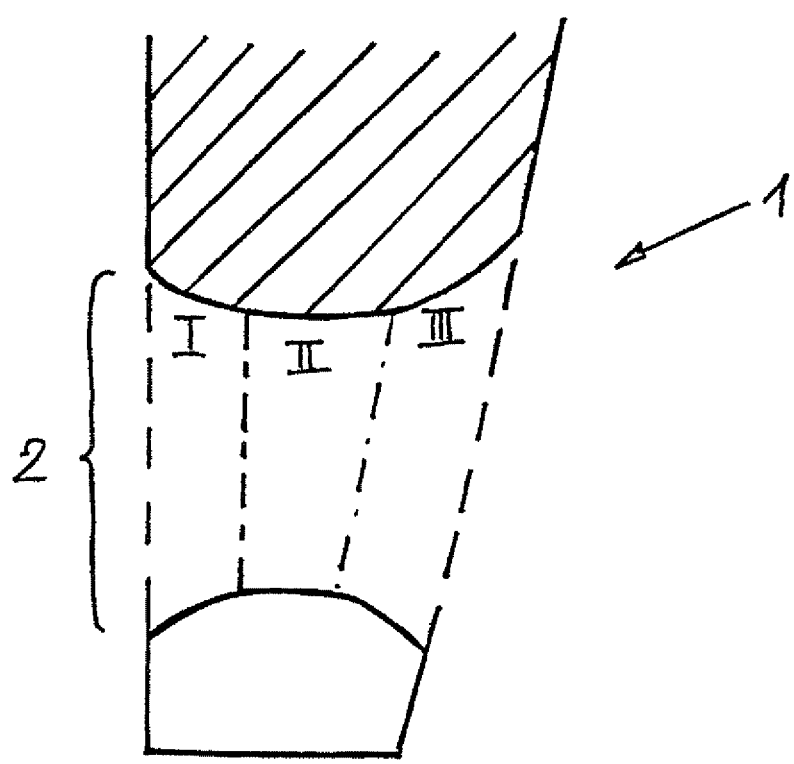
FIG. 2 is a cross section of the piston boss of FIG. 1.

FIG. 2 shows schematically in section the piston boss 1 of the piston which is configured as a single- or multi-piece piston. If the piston is a multi-piece piston, it may consist initially of two or more parts which are joined together and then form a finished, single-piece piston which has a piston skirt. The term "multi-piece pistons" can also be understood to mean pistons called articulated skirt pistons in which a piston upper part is connected to a piston lower part (skirt section) by a pin.

The piston boss 1 of the piston has any type of geometry which is suited to the use of the piston in the combustion engine. The piston boss 1 in which the piston-pin bore is located to accommodate the piston pin can extend to the outer surface (running surface) of the piston or be set back (so-called box design).

In aspect shown in FIG. 2, the continuous form of the piston-pin bore in the axial direction is divided into three sections I, II and III, where more than or fewer than three sections may also be present. These three sections I to III have the geometries shown in FIG. 1 which are oval, circular, cylindrical or similar in shape. Here the transition from a section I with a first design to the next section II with a different design is configured continuously. The same holds true for the transition from section II to section III. The term "design" is to be understood to mean that two adjoining sections may have the same geometrical shape, for example, oval, but different radii for the specific ovality. Moreover, it should be understood under the term "design" that one section can be configured as an oval, for example, and the adjoining section be configured as a circle. All geometries and dimensions can be considered here which are possible for the use of the piston pin in the piston-pin bore, taking into account their geometries and loads.

What is claimed is:

1. A piston with a piston boss in which a piston-pin bore is located to accommodate a piston pin, wherein the piston-pin bore has an inner section extending in a direction of a piston inner area, the widening of the inner section above the piston-pin bore axis, with respect to a piston stroke axis, being less than the widening of the inner section below the piston-pin bore axis, an outer section extending in a direction of a piston outer area, and a middle section disposed between the inner and outer sections concentrically disposed about a piston-pin bore axis, the inner section widening in the direction of the piston inner area wherein each pair of diametrically opposed points in each plane perpendicular to the piston-pin bore axis along the inner section asymmetrically disposed with respect to the piston-pin axis so that one point of each pair of diametrically opposed points in each plane is disposed closer to the piston-pin bore axis and the other point of the pair of diametrically opposed points is disposed farther away from the piston pin bore axis.

2. The piston from claim 1, wherein the outer section widening in the direction of the piston outer area has each pair of diametrically opposed points in each plane perpendicular to the piston-pin bore axis along the outer section asymmetrically disposed with respect to the piston-pin axis so that one point of each pair of diametrically opposed points in each plane is disposed closer to the piston-pin bore axis and the other point of the pair of diametrically opposed points is disposed farther away from the piston pin bore axis.

3. The piston from claim 2, wherein the inner section widening and the outer section widening each define, a trumpet-shaped configuration.

4. The piston from claim 2 wherein a transition formed between one of the inner section and the outer section widenings having a first shape the adjacent middle section having a different shape is continuous.

5. The piston from claim 4 wherein surfaces of the piston-pin bore are configured elliptically over the circumference of the piston-pin bore.

6. The piston from claim 2, wherein:
the widening of the outer section above the piston-pin bore axis, with respect to a piston stroke axis, is less than the widening of the outer section below the piston-pin bore axis.

7. The piston from claim 2, wherein:
the widening of the outer section above the piston-pin bore axis, with respect to a piston stroke axis, is greater than the widening of the outer section below the piston-pin bore axis.

8. The piston from claim 1 wherein a surface of the piston-pin bore is one of round and oval.

9. The piston from claim 1, wherein the piston boss has as one of a trapezoidal and a stepped configuration.

10. The piston from claim 1 wherein the inner section widening, and the outer section widening are configured as ovals, each oval having different radii from the piston-pin bore axis.

* * * * *